May 26, 1942.   F. G. THWAITS   2,284,350
TANK FILLING NOZZLE
Filed Aug. 19, 1939
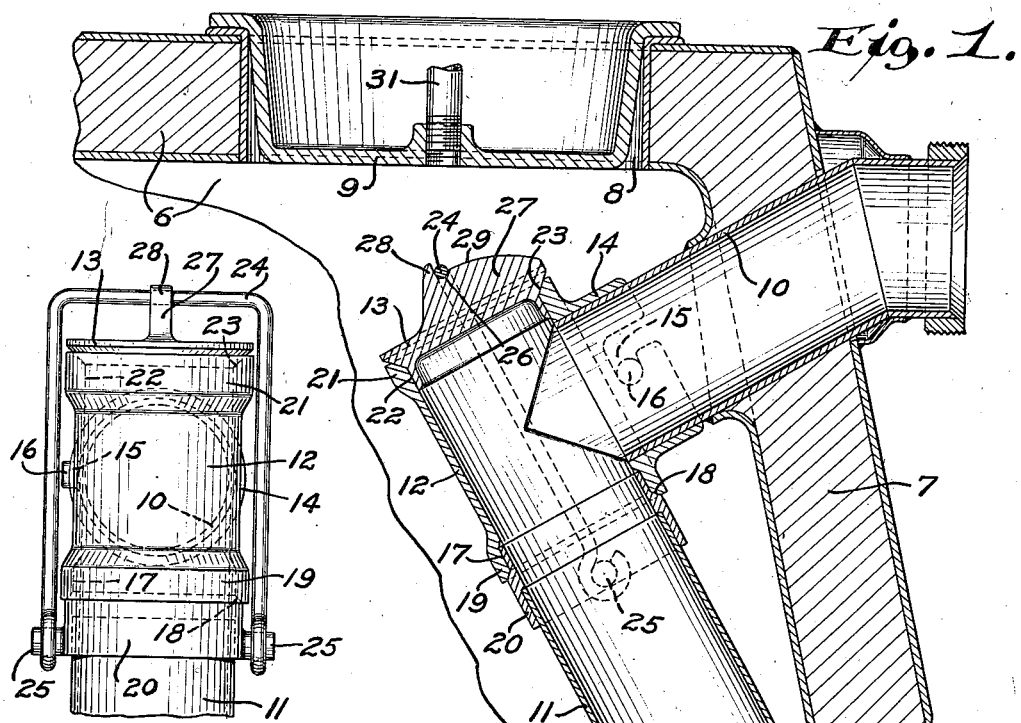
Fig. 1.
Fig. 2.
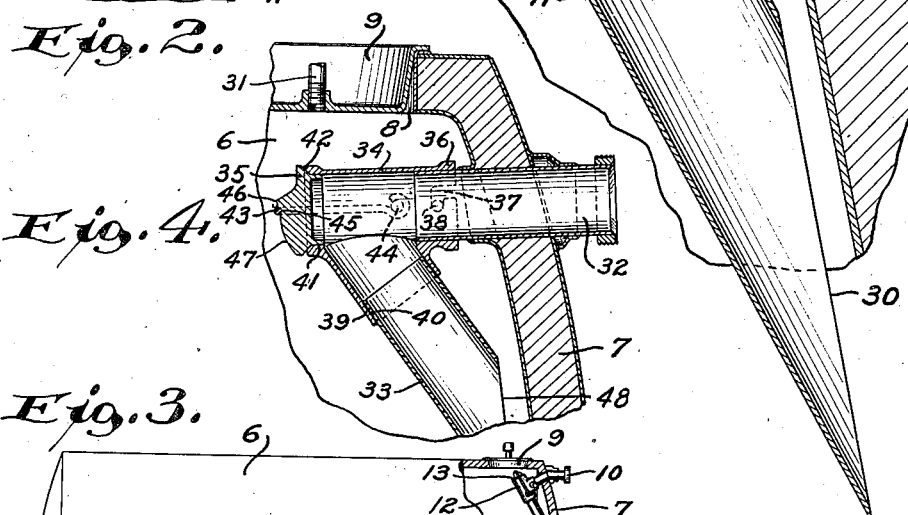
Fig. 4.
Fig. 3.
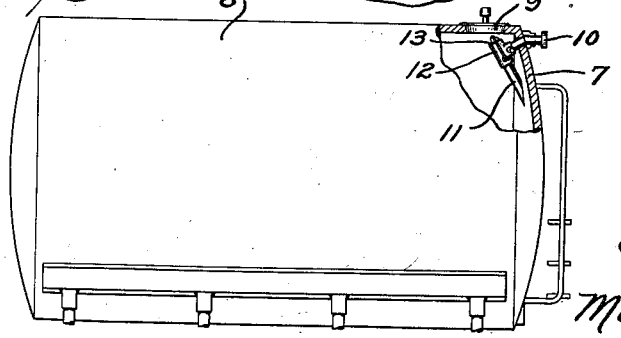
INVENTOR
F. G. Thwaits
BY
Morsell, Lieber & Morsell
ATTORNEYS.

Patented May 26, 1942

2,284,350

UNITED STATES PATENT OFFICE 2,284,350

TANK FILLING NOZZLE

Frederick G. Thwaits, Wauwatosa, Wis., assignor to The Heil Co., Milwaukee, Wis., a corporation of Wisconsin Application August 19, 1939, Serial No. 290,995

10 Claims. (Cl. 220—86)

The present invention relates in general to improvements in the art of dispensing liquid such as milk and of maintaining the dispensing apparatus in sanitary condition, and relates more specifically to improvements in the construction and operation of nozzles for injecting and circulating fluid within a tank or other receptacle.

Generally defined, an object of my present invention is to provide a new and useful tank filling nozzle which is simple in construction, which may be readily assembled and dismantled, and which is moreover highly efficient in use.

In the dairy industry, it is common practice to utilize milk storage tanks having foam preventing filler nozzles for delivering the milk into the receptacle at an oblique angle relative to a dished end head of the enclosure. Because of the specific character of milk, and in order to maintain the tanks and filler nozzles in sanitary condition, it is necessary to thoroughly clean such apparatus at frequent intervals. While the prior tanks and filler nozzle assemblages were relatively satisfactory in normal use, they were not readily accessible for inspection and convenient cleaning, and it was not only difficult to effect such cleaning but considerable time was wasted in order to maintain the prior nozzles in sanitary condition.

It is therefore a more specific object of my present improvement, to provide a simple, durable and efficient tank filler structure, all portions of which are conveniently accessible for inspection and cleaning, and which may be quickly assembled and dismantled with comparative ease.

Another specific object of the invention is to provide an efficient filling nozzle assemblage which may be readily assembled and dismantled within a closed receptacle, from the exterior of the enclosure, and the operation of which is conveniently observable.

A further specific object of my invention is to provide an improved non-foaming receptacle filler nozzle which may be readily properly installed in tanks of various types, and which can be manufactured and sold at moderate cost.

These and other specific objects and advantages will be apparent from the following detailed description.

A clear conception of several embodiments of my present improvement, and of the mode of constructing, assembling, dismantling and of utilizing tank filler nozzles built in accordance with the invention, may be had by referring to the drawing accompanying and forming a part of this specification wherein like reference characters designate the same or similar parts in the various views.

Fig. 1 is a relatively large central vertical section through a preferred type of my improved tank filling nozzle, showing the same applied to a fragment of a milk storage tank;

Fig. 2 is an outside view of a fragment of the nozzle of Fig. 1, looking towards the nozzle inlet;

Fig. 3 is a considerably reduced diagrammatic and part sectional side view of a milk tank, showing one of the improved filling nozzles installed therein; and Fig. 4 is a central vertical section through a modified form of the improved tank filling nozzle, showing the same applied to a fragment of a receptacle.

While the invention has been shown and described as being especially applicable to and advantageous when applied to a milk storage tank, it is not my desire or intent to unnecessarily restrict the scope or utility by virtue of such limited disclosure.

Referring to Figs. 1, 2 and 3 of the drawing, the improved receptacle filler nozzle shown therein is especially applicable to the upper interior end portion of a horizontal cylindrical milk storage tank 6 having a dished end head 7, and also having an inspection opening 8 near the upper portion of the head 7 normally closed by a removable cover 9. The new nozzle of Figs. 1 to 3 inclusive, comprises in general inlet and discharge pipes or conduit portions 10, 11 respectively, the former of which penetrates and is rigidly secured to the tank head 7 and the latter of which is directed towards the dished interior of the head 7 at an acute angle; a hollow member or T-fitting 12 with two of the openings of which the conduit portions 10, 11 are communicable; and a detachable cap 13 normally closing the third T-fitting opening.

The T-fitting 12 has an annular integral flange 14 surrounding its side inlet opening and provided with an angular recess 15 with which a pin 16 carried by and projecting outwardly from the inlet pipe portion 10, is cooperable to provide a detachable bayonet joint. This T-fitting 12 also has a bore 17 and a concentric end chamfer or annular inclined surface 18 within its flange 19 which surrounds the outlet opening thereof, and the outlet pipe portion 11 has a collar 20 rigidly attached to one end thereof and formed for snug coaction with the bore 17 and surface 18. The end of the fitting 12 remote from the flange 19, is provided with a similar annular flange 21 which has a bore 22 and a chamfer or tapered surface 23, with both of which the cap 13 is snugly cooperable; and a spring or bail 24 which is swingably suspended from pins 25 secured to the collar 20, is resiliently cooperable with a groove 26 on the cap 13 as shown in Figs. 1 and 2, in order to simultaneously clamp the collar 20 within the bore 17 and against the surface 18, and the cap 13 within the bore 22 and against the surface 23. The groove 26 is formed in a rib 27 formed integral with the cap 13, and this rib 27 has a stop lug 28 near the groove 26 and is also provided with a cam surface 29 for tensioning the spring bail 24 during clamping movement of the latter. The fixed inlet pipe portion 10 may be rigidly attached to the tank head 7 in any suitable manner as by welding, and the end of the removable discharge pipe portion 11 remote from the clamping sleeve or collar 20 has a diagonal cut surface 30 disposed approximately parallel to and near the dished inner surface of the head 7.

In order to assemble the improved nozzle shown in Figs. 1, 2 and 3 and to install the same in or to remove it from a tank 6, after the various parts have been properly constructed as hereinabove described, the inlet pipe portion 10 should be fixedly applied to the tank head 7 at the proper place and with the proper slope or inclination, and the discharge pipe section 11 and cap 13 may be clamped to the T-fitting 12 so that these elements may be handled as a unit. Then, by removing the closure cover 9 from the tank 6, the unitary fitting 12, portion 11, and cap 13 may be firmly attached to or removed from the end of the conduit portion 10 within the tank, by virtue of the bayonet joint afforded by the recess 15 and cooperating pin 16, and this attachment or removal may be effected through the opening 8. The conduit portion 11 when in normal position, will direct the liquid discharged therethrough along the inner concave surface of the head 7 in the form of a flat spreading sheet or film and will thus prevent foaming of the admitted liquid. If it becomes desirable to remove the discharge pipe portion 11 and the cap 12, this may be done either without removing the T-fitting 12 from the pipe section 10 or after removal of this fitting from the tank 7, by merely swinging the spring bail 24 out of the recess 26 and over the cam surface 29 until it clears the outer edge of the cap 13. The cap 13 will then be freely removable from within the fitting bore 22; and in order to effect such removal of the pipe section 11 and collar 20 from the opposite fitting bore 17, it is only necessary to swing the bail 24 across the open bore 22 until it clears the opposite side of the T-fitting 12 whereupon the collar 20 may be withdrawn from the bore 17 without obstruction. While the removable cover 9 will permit such assembly, dismantling, and cleaning of the nozzle from the exterior of the tank 6 through the inspection opening 8, this cover will normally be closed and may be provided with a suitable vent 31.

Referring specifically to Fig. 4 of the drawing, the improved modified filling nozzle assemblage shown therein may again be applied to a tank 6 having a dished end head 7 similar to that of Figs. 1, 2 and 3, but the nozzle is of slightly different construction. In this embodiment of the invention, the filling nozzle comprises in general inlet and outlet conduits or pipe portions 32, 33 respectively, the former of which penetrates the tank head 7 horizontally and is rigidly attached thereto, and the latter of which is directed at an acute angle towards the inner dished surface of the head; a hollow member or fitting 34 having three openings, with two of which the conduit portions 32, 33 are communicable; and a detachable cap 35 normally closing the third fitting opening.

The fitting 34 is of a modified T-type, and has an annular flange 36 surrounding the inlet opening thereof, this flange 36 being provided with an angular recess 37 with which a pin 38 secured to the inlet pipe portion 32 is cooperable to provide a detachable bayonet joint. The modified T-fitting 34 also has an annular internally threaded flange 39 surrounding its inclined discharge opening, with which the upper threaded end 40 of the outlet pipe portion 33 is detachably cooperable. The end of the fitting 34 remote from the flange 36 is provided with a bore 41 and with a chamfer or annular tapered surface 42, with both of which the cap 35 is snugly cooperable; and a resilient bail 43 which is swingably suspended from opposite side pins 44 secured to the fitting 34, is cooperable with a groove 45 to normally hold the cap 35 in closed position, as shown in Fig. 4. The cap 35 is again provided with a stop lug 46 at one side of the groove 45, and with a cam surface 47 at the other side thereof for tensioning the spring bail 43. The fixed inlet pipe portion 32 may be firmly attached to the tank head 7 in any suitable manner as by welding, and the lower portion of the discharge pipe portion 33 remote from the threaded end 40 thereof has a diagonal surface 48 disposed approximately parallel to the inner concave surface of the head 7 and closely adjacent to this surface.

In assembling the improved nozzle shown in Fig. 4, and in order to install the same within or to remove it from the tank 6, after the various parts have been properly constructed as above described, the inlet pipe portion 32 should be rigidly attached to the tank head 7 near the upper portion thereof in an approximately horizontal position, and the discharge pipe section 33 and cap 35 may be clamped to the fitting 34 so that these elements may be handled as a unit. Upon removal of the closure cover 9 from the tank 6, the unitary assemblage comprising the fitting 34, pipe portion 33 and cap 35, may be firmly attached to or removed from the inner end of the conduit portion 32, by virtue of the bayonet joint comprising the recess 37 and pin 38, and such attachment or removal may be effected through the tank opening 8. The conduit portion 33 when in the position shown in Fig. 4, will direct the liquid discharged through the nozzle along the inner concave surface of the head 7 in the form of a spreading sheet of film and will thus prevent foaming of the liquid entering the tank 6. When it becomes desirable to remove the discharge pipe portion 33, this may be done at any time by merely unscrewing the end 40 thereof from the fitting flange 39. If it becomes desirable to remove the cap 35 from the fitting 34, this may likewise be done at any time by merely swinging the bail 43 out of the recess 45 and along the cam surface 47 until the cap 35 can be withdrawn from the bore 41. Such removal of the pipe section 33 and cap 35 may be accomplished without removing the fitting 34 from the pipe section 32, and the entire fitting 34 with its associated parts may obviously be readily removed from the pipe section 32. The removable cover 9 will obviously permit access to the nozzle for inspection and cleaning, and this cover may likewise be provided with a suitable vent 31.

From the foregoing detailed description it will be apparent that my present invention provides an improved tank filling nozzle assemblage which may be readily assembled and dismantled, and all parts of which are quickly accessible for inspection and cleaning. The various parts of both assemblages are extremely simple and durable in construction, and may be conveniently manipulated and positioned for proper functioning. The improved filling nozzle is especially applicable to milk storage tanks because of the facility with which it may be cleaned and maintained in sanitary condition. The embodiment of the invention shown in Fig. 1 has the advantage that it obviates reverse turns in the path of travel of the fluid, and it can be more quickly assembled and dismantled due to the elimination of screw thread connections. While I have specifically shown the use of standard T-fittings in the production of my improved nozzle assemblages, I also intend to utilize standard elbow fittings or the like in substitution for the T-fittings. The bayonet joint which eliminates objectionable threaded connections, may also be applied to either or both conduit portions, and can be readily cleaned as well as being quickly attachable and detachable. The sleeve connections of this assemblage can also be more readily cleaned, but both of the assemblages will obviously permit maintenance of sanitary conditions with minimum delay in normal use of the tank 6.

It should be understood that it is not desired to limit this invention to the exact details of construction or to the precise mode of use, herein shown and described, for various modifications within the scope of the claims may occur to persons skilled in the art.

I claim:

1. A filler nozzle comprising, a T-fitting having three inter-communicating openings each surrounded by a flange, conduit portions for admitting liquid to and from said fitting through two of said openings, a bayonet joint detachably connecting one of said conduit portions with the flange surrounding one of said openings, a collar carried by the other of said conduit portions and wedgingly coacting with another of said flanges, and a cap detachably secured to the other of said flanges and being connected to said collar through means additional to the T-fitting.

2. A filler nozzle comprising, a T-fitting having three inter-communicating openings each surrounded by a flange, conduit portions for admitting liquid to and from said fitting through two of said openings, a bayonet joint detachably connecting one of said conduit portions with the flange surrounding one of said openings, a collar coacting with another of said flanges, a detachable connection between the other of said conduit portions and said collar, a cap coacting with the other of said flanges, and a resilient bail for detachably securing said cap and said collar to said fitting.

3. A filler nozzle comprising, a fitting having inlet and outlet openings and another opening disposed in alinement with one of said openings, a conduit portion communicating with said fitting through each said inlet and outlet openings, a cap coacting with said fitting at said other opening, and a resilient bail detachably securing said cap and said alined conduit portion to each other and to said fitting.

4. A filler nozzle comprising, a fitting having inlet and outlet openings and another opening disposed in alinement with one of said first-mentioned openings, two conduit portions coacting with said fitting at said inlet and outlet openings, a cap coacting with said fitting at said other opening to close the same, and common means directly engaging both the cap and one of said conduit portions for detachably attaching both of the same to said fitting.

5. A filler nozzle comprising, a T-fitting having alined end bores and an intervening opening, a pipe communicating with said fitting through said opening, another pipe coacting with one of said end bores, a cap coacting with the other of said bores, and a resilient bail secured to said other pipe on opposite sides of said fitting and coacting with said cap to simultaneously clamp said other pipe and said cap within said bores.

6. A filler nozzle comprising, a T-fitting having alined end bores and adjacent tapered surfaces and an intervening opening, a pipe communicating with said fitting through said opening, another pipe coacting with one of said bores and with the adjacent tapered surface, a cap coacting with the other of said bores and with the adjacent tapered surface, and a resilient bail secured to said other pipe and coacting with said cap to simultaneously clamp said other pipe and said cap against said tapered surfaces.

7. A filler nozzle comprising, a fitting having annular tapered surfaces at the opposite ends thereof and an intervening opening, a pipe communicating with said fitting through said opening, another pipe coacting with one of said tapered surfaces, a cap coacting with the other of said tapered surfaces, and a bail secured to said other pipe and coacting with said cap to simultaneously clamp said other pipe and said cap against said tapered surfaces.

8. In combination, a tank having an end head provided with an internal concave surface and also having an opening near the upper portion of said head, a liquid inlet pipe secured to and penetrating said head near said opening, a fitting having bayonet joint connection with the end of said pipe within said tank near said opening, a detachable pipe directed from said fitting towards the concave surface of said head, and a detachable cap for effecting access to said fitting, said cap being removable from said fitting and applicable thereto through said opening.

9. In combination, a tank having an end head and an opening near said end head, a liquid inlet pipe penetrating said head near said opening, a T-fitting detachably secured to the inner end of said pipe, a liquid discharge pipe detachably secured to said fitting and being directed towards said end head, and means operable through said opening and by displacement of said discharge pipe about the axis of said inlet pipe, for effecting removal of said fitting from said inlet pipe or attachment thereto.

10. A filler nozzle comprising, a fitting having alined end bores and an intervening opening, one of said bores having an adjacent tapered surface, a pipe communicating with said fitting through said opening, another pipe coacting with one of said bores, a cap coacting with the other of said bores and with the adjacent tapered surface, and a resilient bail pivotally suspended from said fitting and coacting with said cap to simultaneously clamp said cap against said tapered surface.

FREDERICK G. THWAITS.